United States Patent [19]

Buchanan et al.

[11] Patent Number: 4,653,031

[45] Date of Patent: Mar. 24, 1987

[54] MAPPING FAULTS IN A GEOLOGICAL SEAM

[75] Inventors: David J. Buchanan, Burton-on-Trent; Richard Davis, Ashby-de-la-Zouch; Peter J. Jackson, Burton-on-Trent; Iain M. Mason, Oxford, all of England

[73] Assignee: Coal Industry (Patents) Limited, London, England

[21] Appl. No.: 193,861

[22] Filed: Oct. 3, 1980

[30] Foreign Application Priority Data

Oct. 19, 1979 [GB] United Kingdom ............... 7936412

[51] Int. Cl.⁴ ............................................. G01V 1/30
[52] U.S. Cl. ....................................... 367/59; 367/56; 367/14
[58] Field of Search ...................... 367/56, 58, 59, 14, 367/36, 23

[56] References Cited

U.S. PATENT DOCUMENTS 3,629,798 12/1971 Rockwell .............................. 367/36
3,858,167 12/1974 Stos et al. ............................. 367/36

FOREIGN PATENT DOCUMENTS 989059  5/1976 Canada .................................. 367/56
1360282 7/1974 United Kingdom .
1359719 7/1974 United Kingdom .
2032103 4/1980 United Kingdom ................... 367/14
2061506 5/1981 United Kingdom ................... 367/56
2061507 5/1981 United Kingdom ................... 367/59
270275  8/1970 U.S.S.R. .

OTHER PUBLICATIONS

Buchanan, "The Location of Faults by Underground Seismology", 8/79, pp. 419-427, Colliery Guardian Annual Review.
Capan et al., "Long-Period . . . Seismic Array", 6/69, pp. 305-329, Geophysics, vol. 34, #3, G-222.
Buchanan et al., "Fault Location . . . Coal Seams", 7/81, pp. 994-1002, Geophysics, vol. 46, #7, G-222.
Mason et al. "Channel Wave . . . Kingdom", Soc. Explor. Geophys, Annu Int. Meeting (SGAMB7), 10/29/78, San Francisco, Calif.

Primary Examiner—Nelson Moskowitz
Attorney, Agent, or Firm—James C. Wray

[57] ABSTRACT

An area of a seam is defined and a series of shot locations and detectors are arranged along one side of the area to determine reflected signals. Transmitted signals are also received from a line of shot locations on the other side of the area. The signals received are processed according to an adaptive lag-summing technique to give a map showing the geological faults in the seam.

10 Claims, 8 Drawing Figures

MAPPING FAULTS IN A GEOLOGICAL SEAM

BACKGROUND OF THE INVENTION

This invention relates to a method of mapping faults in a geological seam and is particularly, although not exclusively, applicable to forecasting and locating faults in a coal seam.

In patent application Ser. No. 086,628 a method is disclosed of mapping a geological seam which employs an array of detectors located at one area of a seam to detect reflected signals of a shot fired at a different area of the seam and through a processing of the signals received by the detectors, to create a set of recompressed signals which are analysed by a radial or elliptical lag sum technique to produce a reconstructed halograph or map of the seam indicating any faults thereon. Although this method produces a useful indication of the faults in the seam and a map thereof it is not as accurate as is often required.

SUMMARY OF THE INVENTION

It is an object of the present invention to provide an improved and more accurate method of mapping the faults in a seam.

Generally, in the present invention, an area of a seam is defined and a series of shot locations and detectors are arranged along one side of the area to determine reflected signals. Transmitted signals are also received from a line of shot locations on the other side of the area. The signals received are processed according to an adaptive lag-summing technique to give a map showing the geological faults in the seam.

More specifically, according to the present invention a method of mapping faults in a geological seam includes the steps of forming a plurality of boreholes in the seam, locating detector means in each of the boreholes, firing a sequence of shots along the seam at locations removed from the detector means and collecting reflected and/or transmitted signals at the detector means, converting said signals into electrical signals and applying a lag sum process to the signals to produce a map for each shot and summing the maps so produced according to the formula:

$$I_f(x,y) = \sum_{j=1}^{J} I_j(x,y)$$

where $I(x,y)$ is the unnormalised probability of a seismic event for a shot $j$ and $J$ is the number of shots fired.

This method is an improvement on the previous system using elliptical and radical time lag sum techniques (ELS and RLS) and the technique involved is conveniently considered hereinafter as an adaptive lag sum technique (ALS).

These and other and further objects and features of the invention are apparent in the disclosure which includes the above and below specification and claims and drawings.

DETAILED DESCRIPTION OF THE DRAWINGS

In order to understand the invention fully a brief description will now be given of the lag sum processing.

Lag-sum processors are frequently described in seismic exploration literature as Huygens-Kirchoff diffraction stack migration operators. Data is migrated from a space-time section to a space-space section, which is required for interpretation. The object of migration is to place structural elements in their proper spatial position.

In lag-sum processing, one associates a travel time, $t_n$, between a picture cell of a map and the position of a geophone. The unnormalised probability $I(x,y)$ of a seismic event within that cell is assigned on the basis of the signal amplitude $S_n(t_n)$ at geophone n. The process is repeated for all N geophones and the results are summed. As disclosed in patent application Ser. No. 086/628, the process is represented by the equation:

$$I(x,y) = \left| \sum_{n=1}^{N} S_n(t_n) \exp\left[iw_c(1 - C_p/C_g)t_n\right] \right|^2$$

Here, x and y are the co-ordinates of a particular picture cell, $w_c$, a chosen mapping frequency, and $C_p$ and $C_g$ are the model phase and group velocities of the frequency $W_c$.

For channel wave imaging, the exponential factor in this equation is important. It accommodates the distinction that must be made in dispersive propagation between group and phase velocities, and this distinction remains even after recompression to produce impulsive-like events. This phase compensation must be applied if coherent imaging is to be achieved with channel wave data. Alternatively, the phase information may be rejected by mapping with the envelopes of the signals. In this case, the formula above remains valid, but with $E_n(t_n)$, the envelope, substituted for $S_n(t_n)$, and the exponential term set equal to unity.

Considerable computations are required to calculate the travel time $t_n$ for each cell-geophone combination in the mapping field. The procedure, however, is extremely flexible. Sources real and virtual may be imaged by assigning $t_n$ to be the travel time between a hypothetical source at the cell, and the geophone. This procedure is called radial-lag-sum (RLS). Alternatively, the travel time can be associated with that from the real source to the cell and thence to the geophone. The resulting map indicates the probable distribution of scatterers in the field. This scheme is called elliptical-lag-sum (ELS).

These variants both have some limitations. Firstly, data from only one shot is analysed to produce a map. Secondly, targets at different angles to the geophone spread are given equal weights. Thirdly, the possibility of mode conversion within the mapping field is ignored.

In order to overcome these defects the present invention applies the adaptive-lag-sum method of the invention.

The first defect noted above is easily repaired simply by repeating the calculation for each shot and summing the maps themselves. That is, if $I_j(x,y)$ is the map for shot $j$, then the summed map for $J$ shots is:

$$I(x,y) = \sum_{j=1}^{J} I_j(x,y)$$

However, the final map display depends not only one $I(x,y)$ but also on the map 'reliability', a term which will be defined shortly.

In many cases faults within coal seams show a smooth trend, which is frequently linear or slightly curved. However, the substructure of the trend can show considerable variability in direction. For long wavelengths, perhaps 20 m or more, such a structure may exhibit all the properties of a smoothly curved interface, but to the short wavelengths, the fault may appear as a series of short scatterers at various angles to the main trend. Standard ELS processing as described previously weights all angles equally. In ALS targets within any range of angles may be preferentially sought. For each map point the geometry of the shot-map point-geophone path is calculated. If this geometry satisfies the given input criterion, the average value of the processed geophone signal within a small time window around the travel time $t_n$ is added into the map array. A separate integer array is stored which keeps track of the number of contributions which have been added to each map point. The map points, geophone and shot locations may be varied in turn until the composite map is generated.

According to the input criterion for the geometry, several different map types may be generated.

Figure 1:
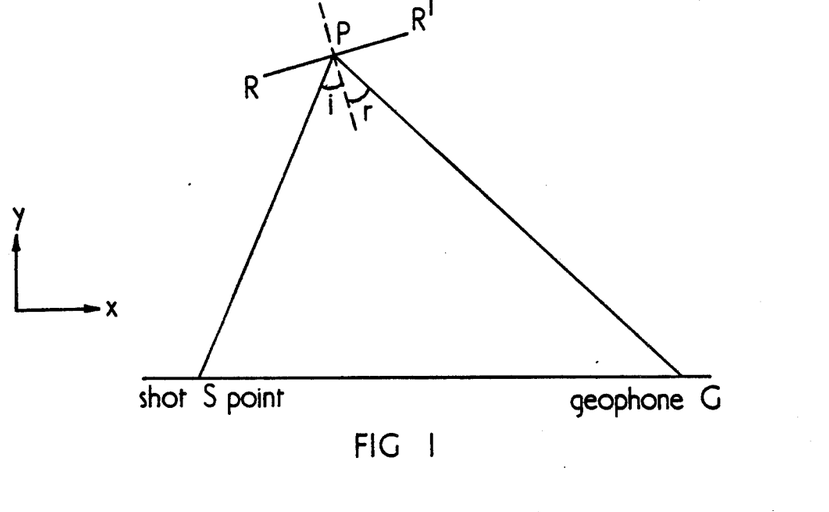
FIG. 1 is a graphical schematic illustration of a reflected ray path for one shot, map element, geophone combination.

The build up of these maps will now be described with reference to the graphical schematic system shown in FIGS. 1 and 2 of the accompanying drawings. Referring first to FIG. 1, an assumed ray path is shown for one shot, map element, geophone combination. Given x and y co-ordinates of the shot point S, geophone location G and map element P, the angle SPG can easily be calculated using standard trigonometric methods. For specular reflection Snell's Law is also satisfied, and for given velocities $V_i$ and $V_r$ this permits the calculation of the angles i and r. The determination of i defines the angle of the reflecting element RR' constituting a fault with respect to the co-ordinate system. If this angle falls within a specified range the criterion is said to be satisfied, and the corresponding average signal value is added to the map. In this calculation $V_i$ is the velocity of the wave before interaction at RR', and $V_r$ is the velocity after. If $V_i = V_r$ the interaction is a constant velocity reflection; if $V_i \neq V_r$ the interaction is a reflection involving mode conversion. For example, one mode of the P-SV type channel waves may be converted into another mode of the P-SV type. This type of calculation is a reflection calculation, whether it involves mode conversion or not.

Figure 2:
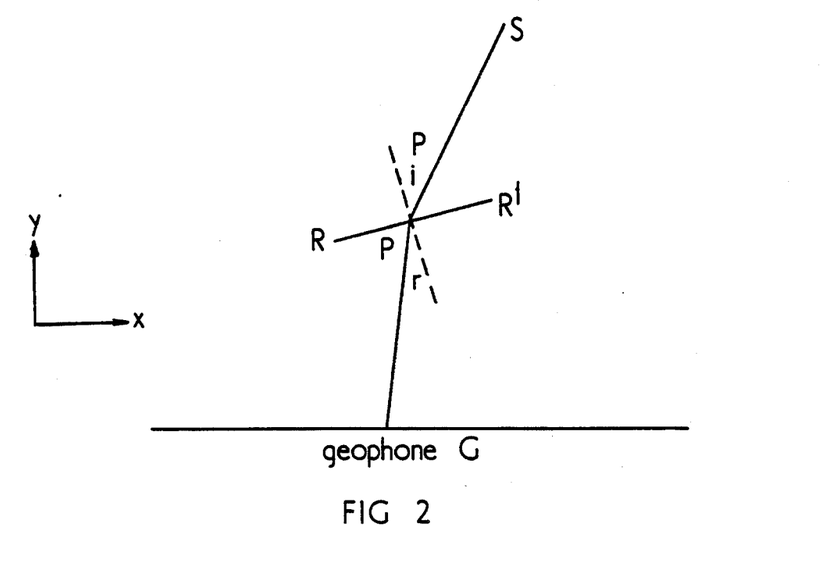
FIG. 2 is a graphical schematic illustration for a transmission calculation.

In FIG. 2 to which reference is now made, the geometry for a transmission calculation is shown. Again, given the co-ordinates of the shot, geophone and map element, the use of Snell's Law permits the calculation of the angle of the reflecting element $RR^1$. In this case, of course, if $V_i = V_r$ the line SPG is straight and there is no mode conversion. We would expect mode conversion to be a possible interaction at a fault.

The same general process can be used to assess the passage of channel waves. The map point is chosen as before. The change of direction that must be suffered by the ray in travelling the shot, map point, geophone path is calculated assuming no mode conversion. If the absolute value of this path deviation from the shot-geophone path is less than some small gain value (say 10°), a contribution is added to the map. This scheme can be used for locating areas in a coal panel which allows the passage of channel waves. In such cases, map points at or close to direct routes from shot to geophone give large map values, if there is a free path for the channel wave and if the correct velocity has been chosen.

All of these mapping schemes are based on the same lagged sum procedure. They differ only in the calculation of $t_n$ and in the geometry calculation.

The calculations may be carried either with envelope data, in which case only group velocities are required, or with the phase information included, in which case group and phase velocities are required. In general, these velocities may be unknown and must be found by producing several maps for different velocities and choosing the best one. In some instances the optimum velocities can be found using an iterative scheme.

Once the map is generated it is necessary to display it in a sensible way. The reliability of any map point is assessed by the number of contributions to that point. This information is available in the contribution array accumulated during the calculation. Clearly a map point with one contribution is less reliable than one with 1000 contributions. The decision between reliability and unreliability is largely subjective. Once a criterion for reliability has been chosen, a new map is calculated which consists of the mean map values at reliable point and zero otherwise. This final map is then contoured and displayed in one of two ways. Either:

(a) a cut-off level is chosen, and only map values above this level are plotted;

or (b) a certain fraction, say p, of the total number of reliable points is chosen, and only the highest p of all values are contoured.

Figure 3A:
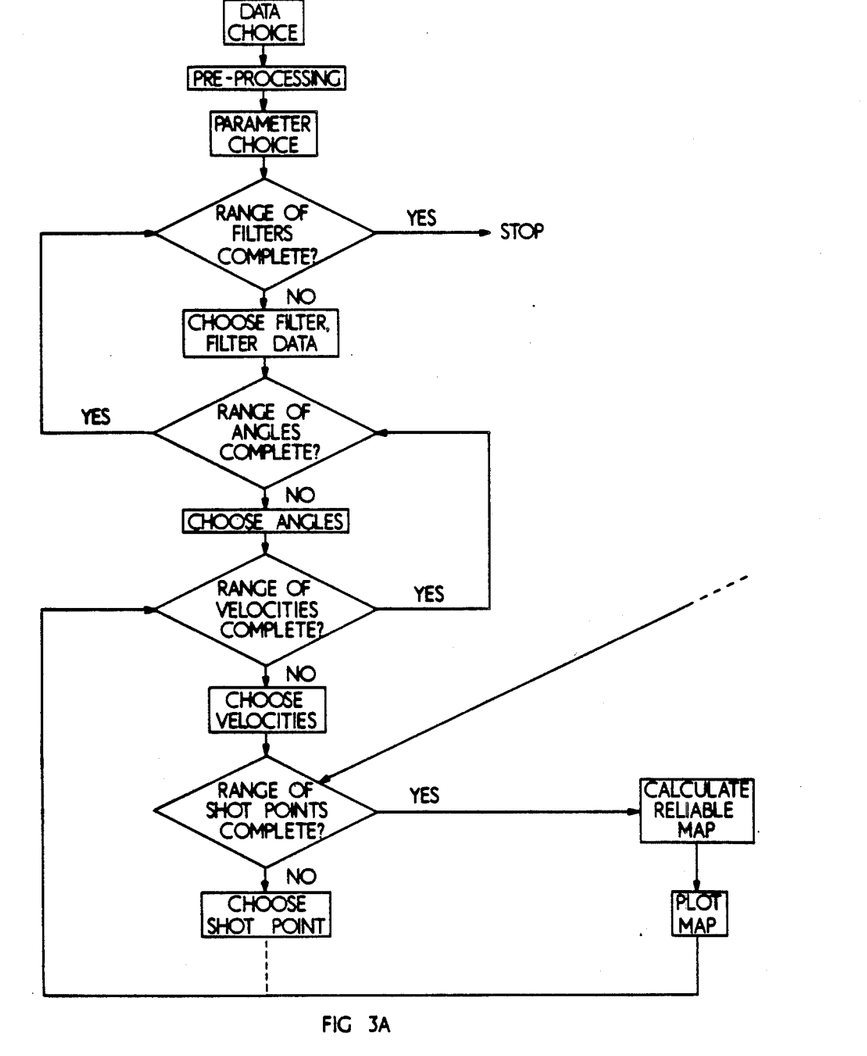
FIG. 3A is a flow chart illustrating a portion of the map calculation.
Figure 3B:
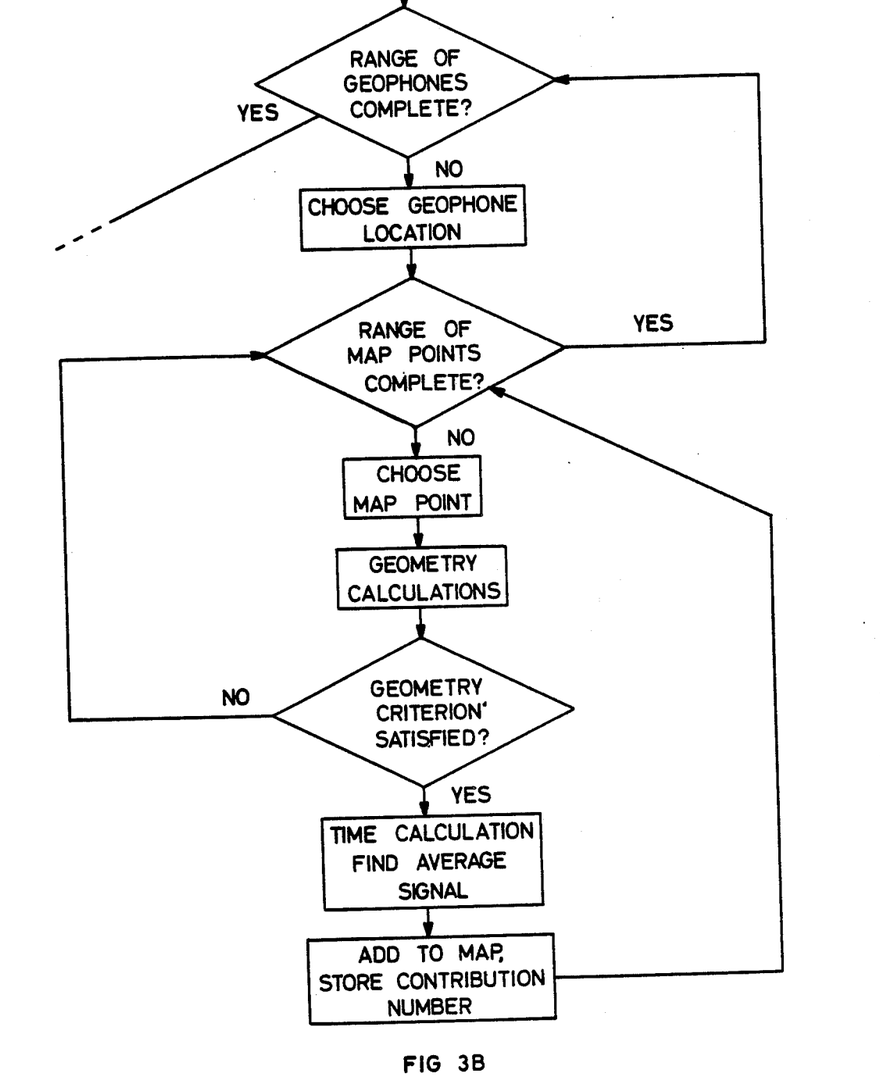
FIG. 3B is a continuation of the flow chart shown in FIG. 3A.

The calculation procedure will now be described with reference to the flow charts of FIGS. 3A and 3B of the accompanying drawings. In the chart the following steps are shown:

Step 1: selection of data to be analysed.

Step 2: pre-processing encompassing noise removal, mean removal recompression of dispersed signals Step 3: selection of range of parameters to be investigated—centre frequencies, angles, velocities Step 4: filter data for required frequency, if all cases covered stop processing.

Step 5: select set of required angles, if all cases covered proceed to step 4.

Step 6: select velocities, if all cases covered proceed to step 5

Step 7: select shot point, if maximum is reached proceed to step 13

Step 8: select geophone location, if maximum is reached proceed to step 7

Step 9: select map point, if maximum is reached proceed to step 8

Step 10: do geometry calculation, if the criterion is satisfied proceed to step 11, if not proceed to step 9.

Step 11: do time calculation and find average signal value in that time slot

Step 12: add average signal value to the map, and contribution number to the contribution array, proceed to step 9

Step 13: choose reliability criterion and calculate new reliable map

Step 14: plot map according to either or both of the two schemes (a) and (b) above, proceed to step 6

This flow chart is, of course, not unique and the procedures need not necessarily be carried out strictly in the order given above.

Figure 4:
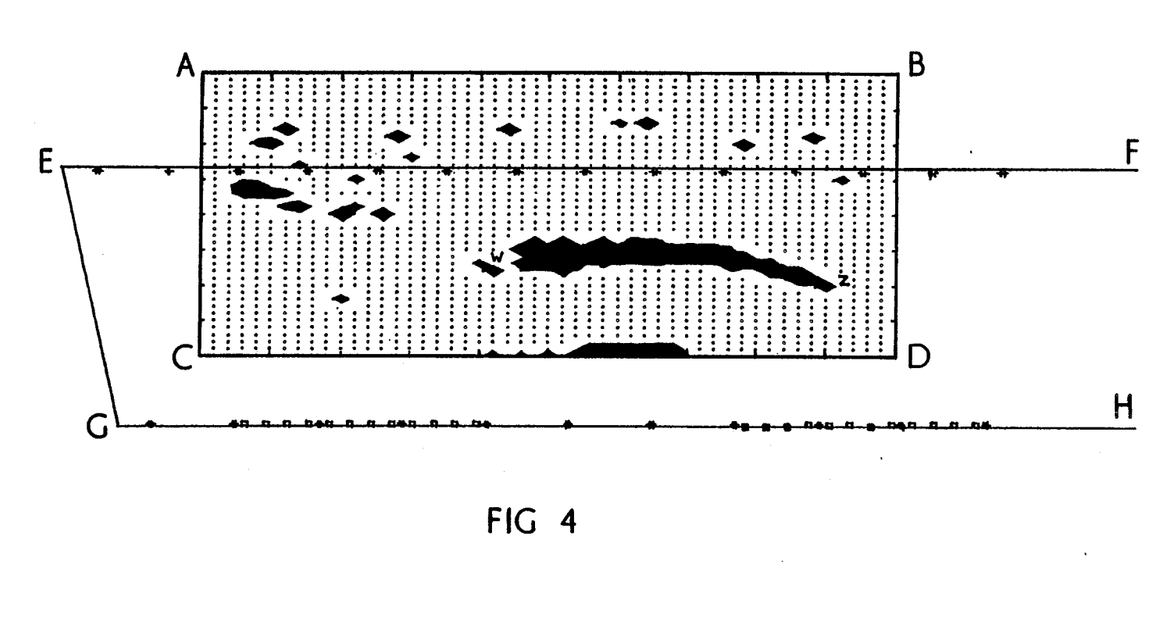
FIG. 4 is a plan view contour map illustrating ASL mapping.
Figure 5:
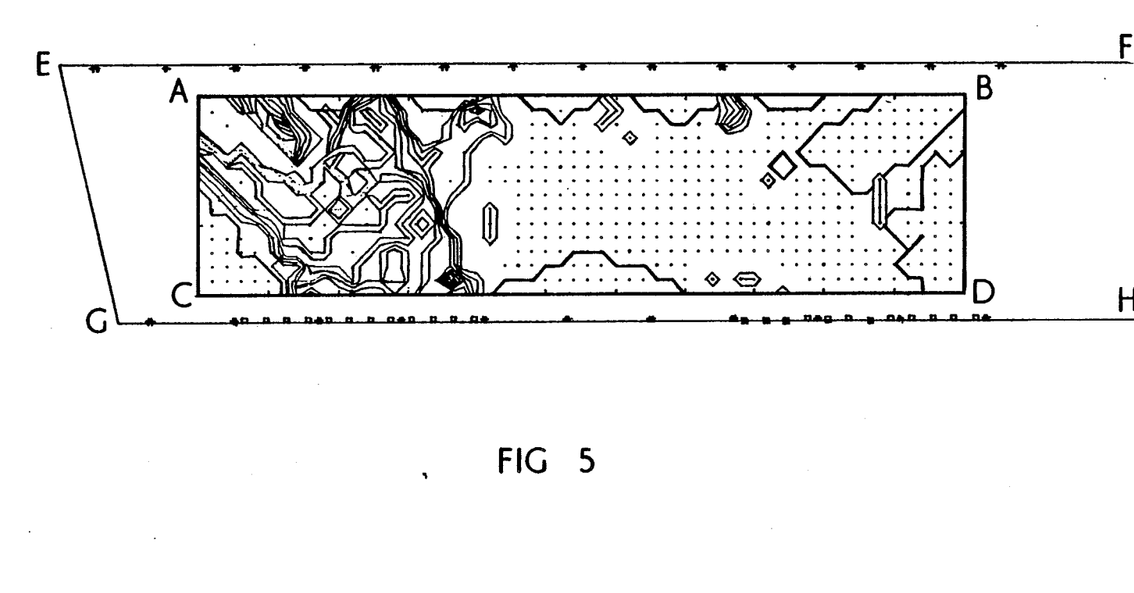
FIG. 5 is another plan view contour map illustrating ASL mapping.

In order to explain the applications of the invention more fully reference will be now made to two examples of ASL mapping. In the accompanying drawings, FIGS. 4 and 5 illustrate the first example and FIGS. 6 and 7 the second. The examples are concerned with the mapping of a coal seam.

In each example a plan view contour map is shown. The map area is designated by ABCD. A coal panel is superposed on each map and is designated EFGH. Shots points are denoted by the sign '+' and geophone by the sign '☐'.

FIG. 4 shows the result of reflection analysis without mode conversion. The heavily contoured region WZ, is interpreted as indicating a fault.

FIG. 5 shows a map constructed to assess the passage of channel waves by transmission across the panel of coal. The heavily contoured region at the left-hand end of the map area indicates free passage of channel waves. To the right of this there are few contours, and this may be interrupted as meaning that a fault in this region has prevented the passage of channel waves. This conclusion agrees with that from FIG. 4.

Figure 6:
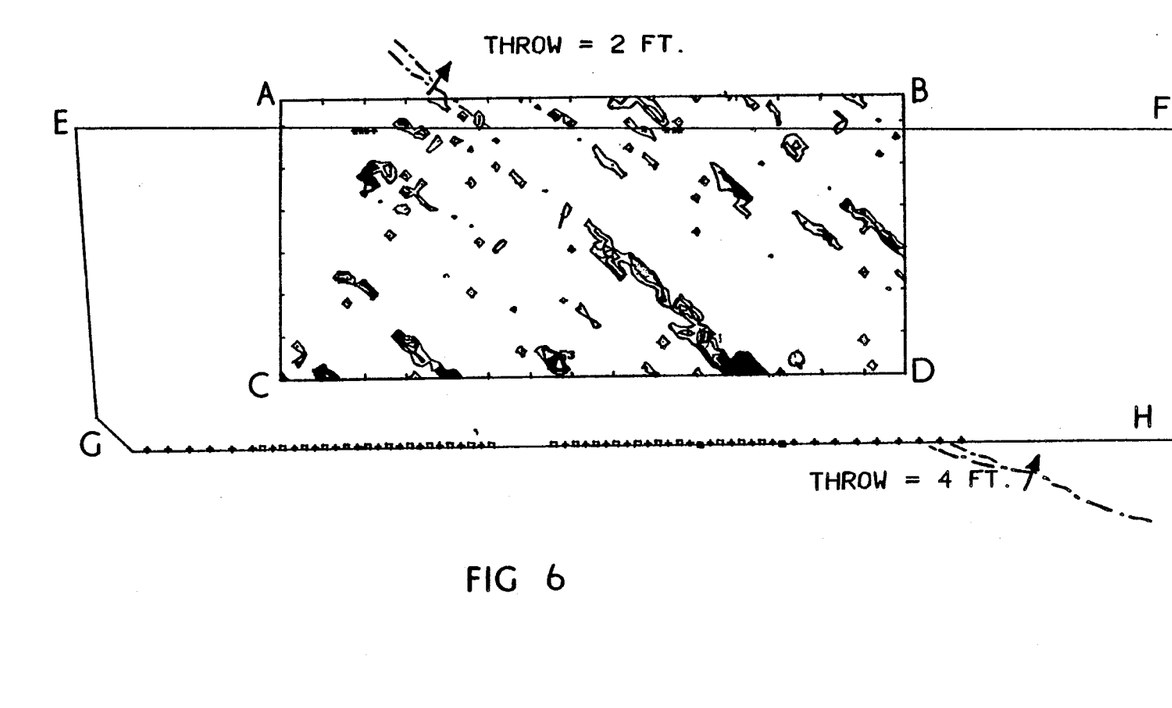
FIG. 6 is yet another plan view contour map illustrating ASL mapping.

FIG. 6 shows the results of reflection analysis with mode conversion. The feature PQ is revealed and this can be interpreted as a fault. This conclusion agrees with the general trend of known faulting at this site. Faults marked 'throw=2 ft' and 'throw=4 ft' have been proved by mining operations.

Figure 7:
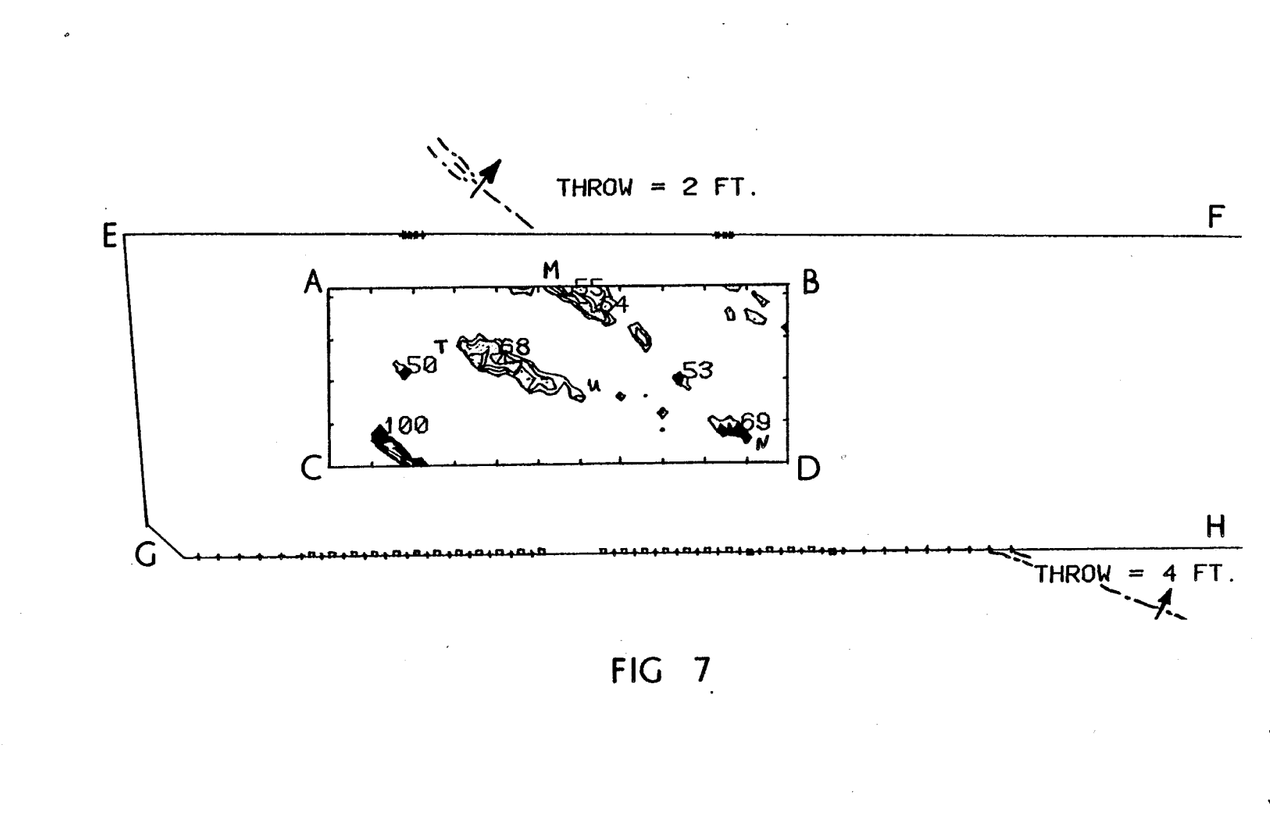
FIG. 7 is still another plan view contour map illustrating ASL mapping.

Finally, FIG. 7 shows fault structure revealed by mode conversion on both reflection and transmission. The feature TU can be interpreted as a fault revealed by mode conversion of waves travelling across the coal panel. The feature MN appears to be a fault revealed by mode conversion both on transmission and on reflection. This second feature agrees with the known structure of the site.

It will be seen from the foregoing that by using the adaptive-lag-sum mapping procedure, the advantages have been gained over ELS or RLS techniques of the ability to process data from any number of shots or geophone detectors. The technique further permits an assessment to be made of map reliability and the calculation of a reliable map; imaging of targets within a specified range of a preferential angle, and the imaging of features by both reflector and transmission, in both cases with and without mode conversion.

The invention is therefore able to provide useful intelligence in mining operations to allow a mine manager plenty of time in advance to prepare to deal with expected geological faults to be found as progress is made mining into the seam.

While the invention has been described with reference to a specific embodiment, the exact nature and scope of the invention is defined in the following claims.

We claim:

1. A method of mapping faults in a geological seam including the steps of forming a plurality of boreholes in the seam, locating detector means in each of the boreholes, firing a sequence of shots along the seam at locations removed from the detector means and collecting reflected and non-reflected signals at the detector means, converting the said signals into electrical signals and applying a lag sum process to the signals to produce an elliptical lag map for each shot and summing the elliptical lag maps so produced according to the formula:

$$I_j(x,y) = \sum_{j=1}^{J} I_j(x,y)$$

where I(x,y) is the unnormalised probability of a seismic event for a shot j and J is the number of shots fired.

2. A method of mapping faults in a geological seam including the steps of forming a plurality of boreholes in the seam, locating detector means in each of the boreholes, firing a sequence of shots along the seam at locations removed from the detector means and collecting reflected and transmitted signals at the detector means, converting the said signals into electrical signals and applying a lag sum process to the signals to produce an elliptical lag map for each shot and summing the elliptical lag maps so produced according to the formula:

$$I_j(x,y) = \sum_{j=1}^{J} I_j(x,y)$$

where I(x,y) is the unnormalized probability of a seismic event for a shot j and J is the number of shots fired, wherein the reflected signals are collected and a point of reflection deduced for a range of signal velocities from calculation of the reflection angles.

3. A method of mapping faults in a geological seam including the steps of forming a plurality of boreholes in the seam, locating detector means in each of the boreholes, firing a sequence of shots along the seam at locations removed from the detector means and collecting reflected and transmitted signals at the detector means, converting the said signals into electrical signals and applying a lag sum process to the signals to produce an elliptical lag map for each shot and summing the elliptical lag maps so produced according to the formula:

$$I_j(x,y) = \sum_{j=1}^{J} I_j(x,y)$$

where I(x,y) is the unnormalized probability of a seismic event for a shot j and J is the number of shots fired, wherein the transmitted signals are collected and the angle through which the signal is distorted is used to determine a mapping point of a fault.

4. A method of mapping faults in a geological seam including the steps of forming a plurality of boreholes in the seam, locating detector means in each of the boreholes, firing a sequence of shots along the seam at locations removed from the detector means and collecting reflected and transmitted signals at the detector means, converting the said signals into electrical signals and applying a lag sum process to the signals to produce an elliptical lag map for each shot and summing the elliptical maps so produced according to the formula:

$$I_j(x,y) = \sum_{j=1}^{J} I_j(x,y)$$

where I(x,y) is the unnormalized probability of a seismic event for a shot j and J is the number of shots fired, wherein a block of the seam is set out and the detector means are set out along one side interspaced with shot locations for determining reflected signals, and shot locations are spaced out along another side for determining non-reflected signals.

5. A method according to claim 4 in which the shot locations on the another side are parallel or substantially parallel to the detector means.

6. A method of mapping faults in a geological seam including the steps of forming a plurality of boreholes in the seam, locating detector means in each of the boreholes, firing a sequence of shots along the seam at locations removed from the detector means and collecting reflected and transmitted signals at the detector means, converting the said signals into electrical signals and applying a lag sum process to the signals to produce an elliptical lag map for each shot and summing the elliptical lag maps so produced according to the formula:

$$I_j(x,y) = \sum_{j=1}^{J} I_j(x,y)$$

where I(x,y) is the unnormalized probability of a seismic event for a shot j and J is the number of shots fired, wherein the the following steps are used to produce a plot map:

Step 1: selection of data to be analyzed

Step 2: pre-processing encompassing noise removal, mean removal recompression of dispersed signals Step 3: selection of range of parameters to be investigated—centre frequencies, angles, velocities Step 4: filter data for required frequency, if all cases covered stop processing Step 5: select set of required angles, if all cases covered proceed to step 4

Step 6: select velocities, if all cases covered proceed to step 5

Step 7: select shot point, if maximum is reached proceed to step 13

Step 8: select geophone location, if maximum is reached proceed to step 7

Step 9: select map point, if maximum is reached proceed to step 8

Step 10: do geometry calculation, if the criterion is satisfied proceed to step 11, if not proceed to step 9

Step 11: do time calculation, and find average signal value in that time slot

Step 12: add average signal value to the map, and contribution number to the contribution array, proceed to step 9

Step 13: choose reliability criterion and calculate new reliable map

Step 14: plot map, proceed to Step 6.

7. A method of mapping faults in a geological seam including the steps of forming a plurality of boreholes in the seam, locating detector means in each of the boreholes, firing a sequence of shots along the seam at locations removed from the detector means and collecting reflected or signals at the detector means, converting the said signals into electrical signals and applying a lag sum process to the signals to produce an elliptical map for each shot and summing the elliptical lag maps so produced according to the formula:

$$I_j(x,y) = \sum_{j=1}^{J} I_j(x,y)$$

where I(x,y) is the unnormalised probability of a seismic event for a shot j and J is the number of shots fired.

8. A method of mapping faults in a geological seam including the steps of forming a plurality of boreholes in the seam, locating detector means in each of the boreholes, firing a sequence of shots along the seam at locations removed from the detector means and collecting non-reflected signals at the detector means, converting the said signals into electrical signals and applying a lag sum process to the signals to produce a map for each shot and summing the map so produced according to the formula:

$$I_j(x,y) = \sum_{j=1}^{J} I_j(x,y)$$

where I(x,y) is the unnormalised probability of a seismic event for a shot j and J is the number of shots fired.

9. The process of claim 6 wherein Step 14 further comprises choosing a cutoff level and plotting only map values above the cutoff level.

10. The process of claim 6 wherein Step 14 further comprises choosing a fraction "p" of the total number of reliable points and contouring only the highest p of all values.

* * * * *